(12) United States Patent
Kulkarni et al.

(10) Patent No.: US 8,838,636 B2
(45) Date of Patent: Sep. 16, 2014

(54) UNIFYING HETROGENOUS DATA

(71) Applicant: International Business Machines Corporation, Armonk, NY (US)

(72) Inventors: Shrinivas Kulkarni, Bangalore (IN); Karin Murthy, San Jose, CA (US); Debarshi Raha, Madhyamgram (IN); Steffen Schaefer, Munich (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/770,839

(22) Filed: Feb. 19, 2013

(65) Prior Publication Data

US 2013/0166542 A1 Jun. 27, 2013

Related U.S. Application Data

(63) Continuation of application No. 12/346,574, filed on Dec. 30, 2008, now Pat. No. 8,412,734.

(51) Int. Cl.
*G06F 17/30* (2006.01)

(52) U.S. Cl.
CPC .... *G06F 17/30879* (2013.01); *G06F 17/30554* (2013.01)
USPC ........................................ 707/759

(58) Field of Classification Search
USPC ........................................ 707/759
See application file for complete search history.

(56) References Cited

U.S. PATENT DOCUMENTS

| | | | | |
|---|---|---|---|---|
| 6,816,854 B2* | 11/2004 | Reiner et al. | | 707/770 |
| 7,103,593 B2* | 9/2006 | Dean | | 709/225 |
| 7,177,862 B2* | 2/2007 | Zhang et al. | | 707/722 |
| 7,814,114 B2* | 10/2010 | Mi et al. | | 707/760 |
| 7,827,160 B2* | 11/2010 | Kuhr et al. | | 707/705 |
| 7,877,376 B2* | 1/2011 | Thiyagarajan et al. | | 707/717 |
| 2002/0026443 A1* | 2/2002 | Chang et al. | | 707/10 |
| 2003/0023607 A1 | 1/2003 | Phelan et al. | | |
| 2006/0248045 A1* | 11/2006 | Toledano et al. | | 707/2 |
| 2007/0061318 A1 | 3/2007 | Azizi et al. | | |
| 2007/0273518 A1 | 11/2007 | Lupoli et al. | | |
| 2008/0001751 A1 | 1/2008 | Gieseke et al. | | |
| 2008/0263006 A1* | 10/2008 | Wolber et al. | | 707/3 |
| 2008/0313148 A1* | 12/2008 | Kuerschner et al. | | 707/3 |
| 2010/0153870 A1* | 6/2010 | Hoffmann | | 715/767 |

OTHER PUBLICATIONS

Harrison, "EPC Information Service—Data Model and Queries", Auto-ID Centre, Oct. 1, 2003, 21 pp.
Harrison et al., "PML Server Developments", Auto-ID Centre, Jun. 1, 2003, 19 pp.
Nguyen et al., "Event Query Processing in EPC Information Services", SITIS (Dec. 2007), 3rd Int'l IEEE Conf on Signal-Image Tech & Internet-Based System, pp. 146-153.

* cited by examiner

*Primary Examiner* — Josuha Bullock
(74) *Attorney, Agent, or Firm* — Kali Law Group, P.C.

(57) ABSTRACT

Systems of computer hardware for unifying data are presented including: a complex enterprise query client; a web sphere federation server (WSFS) electronically coupled with the complex enterprise query client, the WSFS configured for receiving a complex query from the complex enterprise query client; a first and second data service wrapper of a number of wrappers configured for transforming a first and second subquery of the complex query corresponding with a first and second data type into a first and second data query; and a network traversal framework configured for receiving the first data query and the second data query, for sending consolidated first and second data results corresponding with the first and second data query to the first and second data service wrapper.

14 Claims, 2 Drawing Sheets

US 8,838,636 B2

UNIFYING HETROGENOUS DATA

CROSS-REFERENCE TO RELATED APPLICATIONS

The present invention is related to the following applications, all of which are incorporated herein by reference:

This application, is a continuation (continuation-in-part) of commonly assigned co-pending U.S. patent application Ser. No. 12/346,574 filed Dec. 30, 2008 and entitled, "UNIFYING HETROGENOUS DATA."

FIELD OF THE INVENTION

This disclosure generally relates to information technology and, more particularly, to unifying data.

BACKGROUND OF THE INVENTION

Trade data has three dimensions, namely, transactional data (such as, for example, purchase order, invoice, etc.), master data (such as, for example, product information, location information etc.), and data about movement of physical goods across the supply chain (such as, for example, radio-frequency identification (RFID) electronic product code (EPC) event data). These data are available in different data services distributed over different trading partner networks. Master data may be available in industry standards based on a global data synchronization (GDS) network, product movement information is available in an EPC network and transaction data may be available in an electronic data interchange (EDI) and/or futuristic on-demand transactional information services network.

Typically, in existing approaches, an enterprise query (that is, a complex query that touches multiple enterprise applications) in supply chain applications involves complex cartesian joins across these three sets of data that are distributed in multiple data service end points. Added to the complexity is that the target service end points have to be determined dynamically. However, existing approaches do not include solutions that cater to all the three fields because, for example. RFID/EPG network is just starting to surface.

Additionally, existing approaches include many disadvantageous. For example, in some approaches, the client must issue a sequence of sub-queries directed at various services, and the physical markup language (PML) (that is, an XML-based language that defines data on objects) server does not have the ability to break the complex query to a set of sub-queries. Also, in some approaches, the PML server does not execute complex queries, and such approaches require the client to iteratively send sub-queries to multiple PML Services and the registry.

In other existing approaches, the PML service is not designed to produce a composite view. Some approaches may also, while processing a task, discover additional repositories, as well as construct new data acquisition tasks in addition to required data. Additionally, in some approaches, a crawling task, in addition to producing a result for insertion into the data space, produces new data acquisition tasks.

Other existing approaches cannot map an end user query to data source specific queries, while other approaches require storing acquired data to a database system before Query Processing Subsystem can process a user query. Further, some approaches consider only one type of data source (database), only EPCIS Simple Event queries, and only EPCIS related query decomposition.

In yet other disadvantageous existing approaches, ail possible queries arc not executed, as the user needs to select from predefined queries and/or conditions from an on-screen form.

SUMMARY OF THE INVENTION

Principles of this invention provide techniques for unifying data. An exemplary method (which may be computer-implemented) for unifying data, according to one aspect of the invention, can include steps of transforming a query into one or more sub-queries that can be answered by one or more types of data services, and wherein the query touches one or more joins across data residing in one or more services, hereinafter also referred to as enterprise systems, querying one or more target data services for each of the one or more sub-queries, aggregating one or more sets of results based on the one or more target data services, and unifying the one or more sets of aggregated results.

At least one embodiment of this invention can be implemented in the form of a computer product including a computer usable medium with computer usable program code for performing the method steps indicated. Furthermore, at least one embodiment of tire invention can be implemented in the form of a system including a memory and at least one processor that is coupled to the memory and operative to perform exemplary method steps.

These and other objects, features and advantages of the present invention will become apparent from the following detailed description of illustrative embodiments thereof which is to be read in connection with the accompanying drawings.

As such, systems of computer hardware for unifying data are presented including: a complex enterprise query client; a web sphere federation server (WSFS) electronically coupled with the complex enterprise query client, the WSFS configured for receiving a complex query from the complex enterprise query client; a first data service wrapper of a number of wrappers configured for transforming a first sub-query of the complex query corresponding with a first data type into a first data query; a second data service wrapper of the number of wrappers configured for transforming a second sub-query of the complex query corresponding with a second data type into a second data query, where the first data type and the second data type are dissimilar; and a network traversal framework configured for receiving the first data query and the second data query, for sending consolidated first data results corresponding with the first data query to the first data service wrapper, and for sending consolidated second data results corresponding with the second data query to the second data service wrapper. In some embodiments, systems further include; a first data discovery service of a number of data discovery services in electronic communication with the network traversal framework, the first data discovery service configured for returning a number of first data service servers capable of answering the first data query; and a second data discovery service of the number of data discovery services in electronic communication with the network traversal framework, the second data discovery service configured for returning a number of second data service servers capable of answering die second data query.

In some embodiments, the network traversal framework is farther configured for extracting a first data service search key from the first data query and transmit the first data service search key to the first data discovery service, and the network traversal framework is further configured for extracting a second data service search key from the second data query and transmit the second data service search key to the second data discovery service. In some embodiments, the network traversal framework is further configured for sending the first data query to the number of first data service servers, to receive first data service results from the number of first data service servers, and to consolidate first data service results from the number of first data service servers, and the network traversal framework is further configured for sending the second data query to the number of second data service servers, to receive second data service results from the number of second data service servers, and to consolidate second data service results from the number of second data service servers, In some embodiments, the first data service wrapper is further configured for transforming the consolidated first data results corresponding with the first data query into a first relational format, and the second data service wrapper is further configured for transforming the consolidated second data results corresponding with the second data query into a second relational format. In some embodiments, the first and second relational formats are relational tables on the WSFS such that all results corresponding with the complex query are available to the complex enterprise query client for any Cartesian joins.

In other embodiments, systems of computer hardware for unifying data are presented including: a complex enterprise query client; a web sphere federation server (WSFS) electronically coupled with the complex enterprise query client, the WSFS configured for receiving a complex query from the complex enterprise query client; an electronic product code information service (EPCIS) wrapper configured for transforming a first sub-query of the complex query corresponding with electronic product code (EPC) data into an EPCIS query; a transactional information service (TIS) wrapper configured for transforming a second sub-query of the complex query corresponding with transactional data into a TIS query; and a network traversal framework configured for receiving the EPCIS query and the TIS query; for sending consolidated EPCIS results corresponding with the EPCIS query to the EPCIS wrapper, and for sending consolidated TIS results corresponding with the TIS query to the TIS wrapper. In some embodiments, systems further include: an EPC discovery service in electronic communication with the network traversal framework, the EPC discovery service configured for returning a number of EPCIS servers capable of answering the EPCIS query; and a TIS discovery service in electronic communication with the network traversal framework; the TIS discovery service configured for returning a number of TIS servers capable of answering the TIS query. In some embodiments, the network traversal framework is further configured for extracting an EPCIS search key from the EPCIS query and transmit the EPCIS search key to the EPC discovery service, and the network traversal framework is further configured for extracting a TIS search key from the TIS query and transmit the TIS search key to the TIS discovery service.

In some embodiments, systems the network traversal framework is further configured for sending the EPCIS query to the number of EPCIS servers, to receive EPCIS results from the number of EPCIS servers, and to consolidate EPCIS results from foe number of EPCIS servers, and the network traversal framework is further configured for sending the TIS query to the number of TIS servers, to receive TIS results from the number of TIS servers, and to consolidate TIS results from the number of TIS servers. In some embodiments, systems the EPCIS wrapper is further configured for transforming the consolidated EPCIS results corresponding with the EPCIS query into a first relational format, and the TIS wrapper is further configured for transforming the consolidated TIS results corresponding with the TIS query into a second relational format. In some embodiments, systems the first and second relational formats are relational tables on the WSFS such that all results corresponding with the complex query are available to the complex enterprise query client for any Cartesian joins.

DETAILED DESCRIPTION OF PREFERRED EMBODIMENTS

Figure 1:
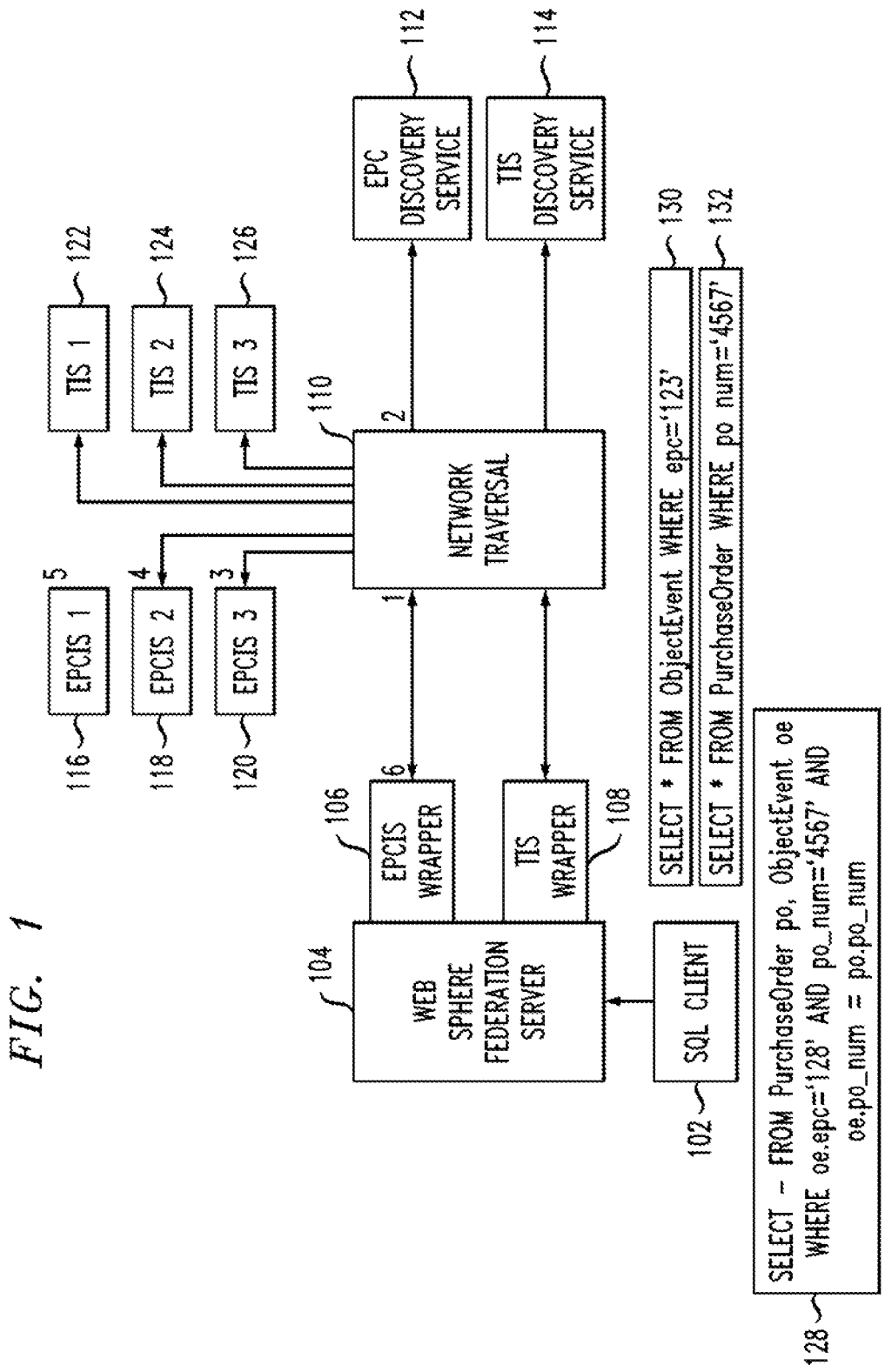
FIG. 1 is a diagram illustrating an exemplary system for unifying data, according to an embodiment of the present invention.

Principles of this invention include providing an on-demand, unified view of electronic product code (EPC) event data, transactional data and master data using dynamic data determination and an information federation across distributed data services. One or more embodiments of the present invention include transforming a complex enterprise query (for example, written in structured query language (SQL)) into multiple simple queries (for example, mostly in XML format) adhering to one of the three types of data services interface (EPC events, master data and transactional data).

Additionally, the techniques described herein include discovering data service end points dynamically based on each of the query fragment, querying one or more target data services for each query fragment and aggregate results, as well as unifying different sets of aggregated results.

As described herein, one or more embodiments of the invention can be used, for example, for trans-continental supply chain visibility, efficient customs clearance, collaborative planning, forecasting, and replenishment, etc. The techniques described herein also enable complex enterprise queries to be written with existing query language such as, for example, SQL.

Existing approaches teach, for example, how to expose database artifacts as web services or access web services from within database systems. There are also products that represent a web service as a relational view inside a database. However, these (as well as a host of Federation Server related items) work only when one knows the web service end points up front. One or more embodiments of the present invention go beyond these aspects and cater to information unification in a network of services wherein the endpoints are discovered dynamically. Also, the techniques described herein can include, for example, unifying the three facets of trade data, which enables complete supply chain visibility laying foundation to Internet of Trade, As used herein, Internet of Trade refers to a network of servers and/or information services, overlaid on the internet, that host information related to international trade. The different information in these servers is logically hyper-linked, and a client can follow these, logical hyper-links to get. the supply chain information relevant to their enterprise.

In contrast to disadvantageous existing approaches detailed above, one or more embodiments of the present invention execute complex queries involving different data sources, and use a Service for determining rather than a local and/or central registry. Also, in contrast to existing approaches, tire techniques described herein are designed to produce a complete composite view to the client. One or more embodiments of the invention fetch required data dynamically (that is, on-demand), and can decide and choose a fragment of the complex (end user) SQL query that can be executed on a remote data source with a single connection.

In an exemplary embodiment of the invention, a sub-query is mapped to the data source specific query and the query is executed with all of the predicates and/or conditions applied for the required data (as supported by the data source). As such, rather than acquiring all tag data, one or more embodiments of the invention dynamically fetch a subset of this data that will be eventually required to answer user query.

The techniques described herein can map an end user query to data source specific queries. For example, a SQL query can be mapped to an EPC information services (EPCIS) SimpleEventQuery. One or more embodiments of the invention process acquired data on the fly to produce results to the end user, wherein a relational view of data can be preserved. Also, as a user can operate on a relational database view, the user can issue any kind of query (in SQL format), if not restricted. Additionally, the techniques described herein include dynamically discovering RFID enterprise servers and/or EPCIS systems (along with other kind of data servers), querying them, and aggregating the results to provide unified view to the client.

As detailed herein, one or more embodiments of the present invention include transforming a complex query into multiple sub-queries directed at different databases corresponding to the different kinds of trade data. Additionally, data service end points can be dynamically discovered based on sub-queries. Each sub-query can be executed on a corresponding database and the results of all the sub-queries can be aggregated.

described herein, breaking a complex SQL query can include, for example, the following. One can implement a Web Sphere Federation Server (WSFS) custom wrapper that breaks down the SQL query involving joins across different types of data sets, identifies which of the query fragments can be successfully queried against which type of data service, and translates each of these query fragments into the query format the target data service expects. Also, dynamic determination of data services can include, for example, in a custom wrapper, extracting the search keys needed by the respective discovery services (for example, EPC Discovery or transactional information service (TIS) Discovery).

Both the search keys and the translated query can men be sent to a network traversal framework. As described herein, a network traversal component traverses through a list of servers, queries each server with the same query (for example, query fragment) and aggregates the query results from all of the servers. A client of such a component is hidden from the details of how each service is reached, how information is aggregated, etc.

A network traversal component can obtain a list of servers from a discovery service and query all of the servers. In a network traversal component depending on type of the query, the search keys are sent to discovery services. Discovery services returns a list of data service end points that can answer the query. The network traversal can also query each of these data services, passing the translated query (and/or sub-query) and security credentials, if any. The results from these data services can be buffered and, once all of the results are available, the results can be aggregated and returned to the wrapper.

As described herein, unifying aggregated results can include, for example, the following. One WSFS nickname (that is, a relational view of remote data) can be defined per type of entity, per data service type (for example, EPC information services (EPCIS) event, master data or TIS). For every query fragment (generally per nickname), the wrapper repeats the dynamic discovery of data services and network traversal steps described above, and gets different sets of aggregated results. The wrapper can map the individual aggregated query results to the nickname(s) and can also populate the nickname. The wrapper also transforms the aggregated query results to relational formats and populates the nicknames. Additionally, in one or more embodiments of the invention, one need not physically store the results to the database (as a nickname is just a view), but one may process the results on the fly to present the results to clients. Further, WebSphere Federation Server can perform the original SQL query by executing a Cartesian joins over these nicknames.

FIG. 1 is a diagram illustrating an exemplary system for unifying data, according to an embodiment of the present invention. By way of illustration, FIG. 1 depicts the elements of a SQL client 102, a WebSphere federation server 104, an EPCIS wrapper 106, a TIS wrapper 108, a network traversal 110, an EPC discovery service 112 and a TIS discovery service 114. FIG. 1 also depicts the elements of EPCIS (1) 116, EPCIS (2) 118, EPCIS (3) 120, TIS (1) 122, TIS (2) 124, and TIS (3) 126.

As depicted in FIG. 1, the SQL query in the lowermost box 128 refers to two tables (for example, nicknames) viz. PurchaseOrder and ObjectEvent. PurchaseOrder details are available in TIS servers and ObjectEvent details are in EPCIS servers. While in deployment, one can associate a PurchaseOrder nickname to a TIS wrapper and an ObjectEvent nickname to an EPCIS wrapper. When a query is issued to one or more embodiments of the invention (which can be deployed on a Federation Server 104), the following steps can occur:

One or more embodiments of the invention identify that the query is a complex query and needs Cartesian, join across two types of data (TIS and EPCIS), Also, WSFS breaks the query into simpler fragments that each server can cater to. The two fragments are shown in two boxes. Box 130 reads as "SELECT*FROM ObjectEvent WHERE epc=123" and box 132 reads as "SELECT*FROM PurchaseOrder WHERE po_num=4S67". Additionally, a first sub-query can be given to the EPCIS wrapper 106 as the sub-query is related to ObjectEvent, and one has associated the ObjectEvent. nickname with an EPCIS wrapper.

Further, as illustrated in FIG. 1, enumerated arrow 1 depicts the EPCIS Wrapper creating an EPCIS query from the SQL query and sending it to Network Traversal 110. Enumerated arrow 2 depicts Network Traversal 110 identifying that it is an EPCIS query, extracting keys to be used with the EPC Discovery Services and sending the search keys (search query) to EPC Discovery Services 112. EPC Discovery Services 112 sends back a list of EPCIS servers that match the search criteria.

Enumerated arrow 3 depicts Network traversal 110 sending the EPCIS query to EPCIS (3) 120. Enumerated arrow 4 depicts Network traversal 110 sending the EPCIS query to EPCIS (2) 118, Enumerated arrow 5 depicts Network traversal 110 sending the EPCIS query to EPCIS (1) 115. Also, enumerated arrow 6 depicts Network traversal 110 aggregating the results from EPCIS (1) 116, EPCIS (2) 118 and EPCIS (3) 120 and sending the consolidated results back to the EPCIS Wrapper 106.

The EPCIS wrapper 106 can transform the consolidated results to a relational format and populate the Object Event nickname in the Federation Server 104. Additionally, the Federation Server 104 can send a second query to TIS Wrapper 108. TIS wrapper 108 follows similar steps that EPCIS Wrapper 106 followed (as described above), albeit with changes in how the TIS query is built, which is specific to each type of service. Once both TIS Wrapper 108 and EPCIS Wrapper 106 have returned the results to federation server 104 (in the form of relational tables), the results are available to SQL clients for any Cartesian joins. By way of example, one or more embodiments of the invention use IBM Web Sphere Federation Server's capability for unifying data.

Figure 2:
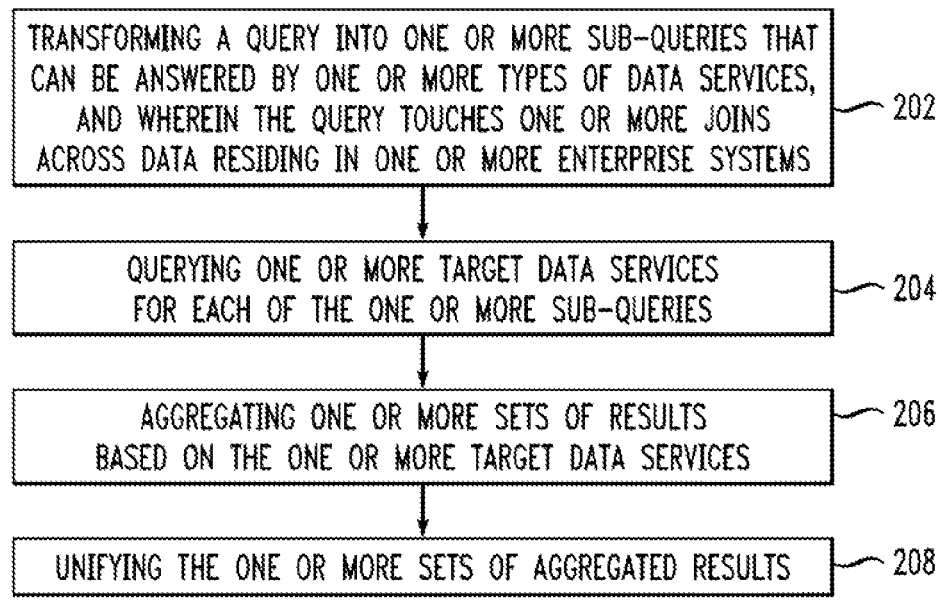
FIG. 2 is a flow diagram illustrating techniques for unifying data, according to an embodiment of the present invention.

FIG. 2 is a flow diagram illustrating techniques for unifying data, according to an embodiment of the present invention. Step 202 includes transforming a query (for example, an enterprise query and/or a complex enterprise query written in SQL) into one or more sub-queries (for example, simple sub-queries written mostly in extensible markup language (XML) that can be answered by one or more types of data services (for example, service oriented architecture(SOA) based), and wherein the query touches one or more joins (for example, Cartesian joins) across data residing in one or more enterprise systems.

The types of data services can include sets of information (for example, structured or unstructured information that is distributed over a network, of data services) that have a query interface (for example, a standard query interface).For example, the types of data services can include electronic product code (EPC) events, master data and transactional data. Also, the enterprise systems can be distributed over geographic and organizational boundaries, and, preferably, these systems are exposed as a SOA service.

Also, transforming a query into one or more sub-queries that can be answered by one or more types of data services can include, for example, segmenting the query (for example, involving joins) across the types of data services into sub-queries, identifying which of the sub-queries can be successfully queried against which type of data service, and translating each of the sub-queries into a query format of a target data service.

One or more embodiments of the invention also include discovering one or more data service end points dynamically based on each of the one or more sub-queries. Discovering data service end points dynamically based on each of the sub-queries can include, for example, extracting one or more search keys (for example, search keys needed by the respective discovery services (for example, EPC Discovery or TIS Discovery)), sending the search keys and the sub-queries to a first service, hereinafter also referred to as a framework component (for example, a network traversal framework), wherein the framework component traverses through a list of one or more servers, queries each server with the same query and aggregates the query results from the one or more servers, and generating (for example, via discovery services) a list of one or more data service end points that can answer the sub-queries, in one or more embodiments of the invention, for example, the framework component queries a discovery service to generate a list of one or more data service end points that can answer the sub-queries.

Step 204 includes querying one or more target data services for each of the one or more sub-queries. Querying target data services for each of the sub-queries can include, for example, using a framework component (for example, a network traversal framework) to query each of die data service end points (for example, wherein the data service endpoints pass the translated query and security credentials, if any), wherein the framework component traverses through a list of one or more servers, queries each server with the same query and aggregates the query results front the one or more servers. Step 206 includes aggregating one or more sets of results based on the one or more target data services.

Step 208 includes unifying the one or more sets of aggregated results. Unifying the sets of aggregated results can include, for example, defining one or more relational views of remote data (referred to herein, for example, as nicknames), where in a relational view of remote data is defined for each of one or more types of entities and for each of one or more types of data services (for example, EPCIS event, master data, TIS, etc.), mapping the one or more sets of aggregated results to the one or more relational views of remote data to populate the one or more relational views of remote data, and performing the query by executing joins over the one or more relational views of remote data. As described herein, a nickname can be referred to, for example, as a relational view of an EPCIS object event in a federation server.

Additionally, the techniques depicted in FIG. 2 can also include repeating the steps of discovering data service end points dynamically and querying target data services for each of die sub-queries to obtain one or more additional sets of aggregated results (for example, data to fulfill the enterprise query as a whole). Further, one or more embodiments of the present invention can include a network traversal framework applicable to both structured and unstructured data networks and various types of discovery mechanisms (for example, search engines). By way of example, the same traversal framework can be used to search, federate and aggregate information over the internet or for aggregating RSS data, etc.

variety of techniques utilizing dedicated hardware, general purpose processors, software, or a combination of the foregoing, may be employed to implement the present invention. At least one embodiment of the invention can be implemented in the form of a computer product including a computer usable medium with computer usable program code for performing the method steps indicated. Furthermore, at least one embodiment of the invention can be implemented in the form of an apparatus including a memory and at least one processor that is coupled to the memory and operative to perform exemplary method steps.

Figure 3:
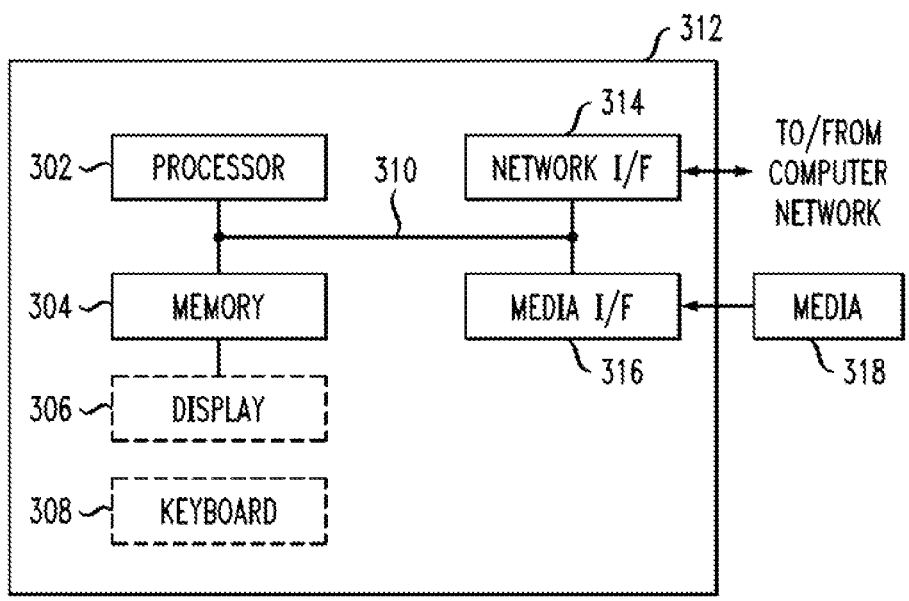
FIG. 3 is a system diagram of an exemplary computer system on which at least one embodiment of the present invention can be implemented.

At present, it is believed that the preferred implementation will make substantial use of software running on a general-purpose computer or workstation. With reference to FIG. 3, such an implementation might employ, for example, a processor 302, a memory 304, and an input and/or output interface formed, for example, by a display 306 and a keyboard 308. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input and/or cutout interface" as used herein, is intended to include, for example, one or more mechanisms for inputting data to the processing unit (for example, mouse), and one or more mechanisms for providing results associated with the processing unit (for example, printer). The processor 302, memory 304, and input and/or output interface such as display 306 and keyboard 308 can be interconnected, for example, via bus 310 as part of a data processing unit 312. Suitable interconnections, for example via bits 310, can also be provided to a network interface 314, such as a network card, which can be provided to interface with, a computer network, and to a media interface 316, such as a diskette or CD-ROM drive, which can be provided to interface-with media 318.

Accordingly, computer software including instructions or code for performing the methodologies of the inversion, as described herein, may be stored in one or more of the associated memory devices (for example, ROM, fixed or removable memory) and, when ready to be utilized, loaded in part or in whole (for example, into RAM) and executed by a CPU. Such software could include, but is not limited to, firmware, resident software, microcode, and the like.

Furthermore, the invention can take the form of a computer program product accessible from a computer-usable or computer-readable medium (for example, media 318) providing program code for use by or in connection with a computer or any instruction execution system. For the purposes of this description, a computer usable or computer readable medium can be any apparatus for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory (for example, memory 304), magnetic tape, a removable computer diskette (for example, media 318), a random access memory (RAM), a read-only memory (ROM), a rigid magnetic disk and an optical disk. Current examples of optical disks include compact disk-read only memory (CD-ROM), compact disk-read anchor write. (CD-R/W) and DVD.

A data processing system suitable for storing and/or executing program code will include at least one processor 302 coupled directly or indirectly to memory elements 304 through a system bus 310. The memory elements can include local memory employed during actual execution of the program code, bulk storage, and cache memories which provide temporary storage of at least some program code in order to reduce tire number of times code must be retrieved from bulk storage during execution.

Input and/or output or I/O devices (including but not limited to keyboards 308, displays 306, pointing devices, and the like) can be coupled to the system either directly (such as via bus 310) or through intervening I/O controllers (omitted for clarity).

Network adapters such as network interface 314 may also be coupled to the system to enable the data processing system to become coupled to other data processing systems or remote printers or storage devices through intervening private or public networks. Modems, cable modem and Ethernet cards are just a few of the currently available types of network adapters.

In any case, it should be understood that the components illustrated herein may be implemented in various forms of hardware, software, or combinations thereof for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention. At least one embodiment of the invention may provide one or more beneficial effects, such as, for example, information unification in a network of services wherein the end points are discovered dynamically.

Although illustrative embodiments of the present invention have been described herein with reference to the accompanying drawings. It is to be understood that the invention is not limited to those precise embodiments, and that various other changes and modifications may be made by one skilled In the art without departing from the scope or spirit of the invention.

What is claimed is:

1. A system of computer hardware for unifying data comprising:
   a complex enterprise query client;
   a web sphere federation server (WSFS) electronically coupled with the complex enterprise query client, the WSFS configured for receiving a complex query from the complex enterprise query client;
   a first data service wrapper of a plurality of wrappers configured for transforming a first sub-query of the complex query corresponding with a first data type into a first data query;
   a second data service wrapper of the plurality of wrappers configured for transforming a second sub-query of the complex query corresponding with a second data type into a second data query, wherein the first data type and the second data type are dissimilar;
   a network traversal framework configured for receiving the first data query and the second data query, for sending consolidated first data results corresponding with the first data query to the first data service wrapper, and for sending consolidated second data results corresponding with the second data query to the second data service wrapper;
   a first data discovery service a plurality of data discovery services in electronic communication with the network traversal framework, the first data discovery service configured for returning a of list of a plurality of first data service servers capable of answering the first data query; and
   a second data discovery service of the plurality of data discovery services in electronic communication with the network traversal framework, the second data discovery service configured for returning a list of a plurality of second data service servers capable of answering the second data query;
   the network traversal framework is further configured for sending the first data query to the plurality of first data service servers, to receive first data service results from the plurality of first data service servers, and to consolidate first data service results from the plurality of first data service servers, and wherein
   the network traversal framework is further configured for sending the second data query to the plurality of second data service servers, to receive second data service results from the plurality of second data service servers, and to consolidate second data service results from the plurality of second data service servers.

2. The system of claim 1, wherein
   the network traversal framework is further configured for extracting a first data service search key from the first data query and transmit the first data service search key to the first data discovery service, and wherein
   the network traversal framework is further configured for extracting a second data service search key from the second data query and transmit the second data service search key to the second data discovery service.

3. The system of claim 1, wherein
   the first data service wrapper is further configured for transforming the consolidated first data results corresponding with the first data query into a first relational format, and wherein the second data service wrapper is further configured for transforming the consolidated second data results corresponding with the second data query into a second relational format.

4. The system of claim 3, wherein the first and second relational formats are relational tables on the WSFS such that all results corresponding with the complex query are available to the complex enterprise query client for any Cartesian joins.

5. The system of claim 1, wherein the complex enterprise query client is a structured query language (SQL) client.

6. The system of claim 1, wherein
the plurality of first data service servers and the plurality of second data service servers are located on one or more enterprise systems, the enterprise systems coupled over a network and distributed over one or more geographic boundaries and one or more organizational boundaries.

7. The system of claim 1, wherein the first data service servers and the second data service servers include structured and unstructured data.

8. The system of claim 1, wherein
the plurality of wrappers are configured for transforming a plurality of sub-queries of the complex query corresponding with a plurality of data types into a plurality of data queries, and wherein
the plurality of data discovery services are configured for returning a plurality data service servers capable of answering the plurality of data queries.

9. A system of computer hardware for unifying data comprising:
a complex enterprise query client;
a web sphere federation server (WSFS) electronically coupled with the complex enterprise query client, the WSFS configured for receiving a complex query from the complex enterprise query client;
an electronic product code information service (EPCIS) wrapper configured for transforming a first sub-query of the complex query corresponding with electronic product code (EPC) data into an EPCIS query;
a transactional information service (TIS) wrapper configured for transforming a second sub-query of the complex query corresponding with transactional data into a TIS query;
a network traversal framework configured for receiving the EPCIS query and the TIS query, for sending consolidated EPCIS results corresponding with the EPCIS query to the EPCIS wrapper, and for sending consolidated TIS results corresponding with the TIS query to the TIS wrapper;
an EPC discovery service in electronic communication with the network traversal framework, the EPC discovery service configured for returning a list of a plurality of EPCIS servers capable of answering the EPCIS query; and
a TIS discovery service in electronic communication with the network traversal framework, the TIS discovery service configured for returning a list of a plurality of TIS servers capable of answering the TIS query, wherein
the network traversal framework is further configured for sending the EPCIS query to the plurality of EPCIS servers, to receive EPCIS results from the plurality of EPCIS servers, and to consolidate EPCIS results from the plurality of EPCIS servers, and wherein
the network traversal framework is further configured for sending the TIS query to the plurality of TIS servers, to receive TIS results from the plurality of TIS servers, and to consolidate TIS results from the plurality of TIS servers.

10. The system of claim 9, wherein
the network traversal framework is further configured for extracting an EPCIS search key from the EPCIS query and transmit the EPCIS search key to the EPC discovery service, and wherein
the network traversal framework is further configured for extracting a TIS search key from the TIS query and transmit the TIS search key to the TIS discovery service.

11. The system of claim 9, wherein
the EPCIS wrapper is further configured for transforming the consolidated EPCIS results corresponding with the EPCIS query into a first relational format, and wherein
the TIS wrapper is further configured for transforming the consolidated TIS results corresponding with the TIS query into a second relational format.

12. The system of claim 11, wherein the first and second relational formats are relational tables on the WSFS such that all results corresponding with the complex query are available to the complex enterprise query client for any Cartesian joins.

13. The system of claim 9, wherein the complex enterprise query client is a structured query language (SQL) client.

14. The system of claim 9, wherein
the plurality of EPCIS servers and the plurality of TIS servers are located on one or more enterprise systems, the enterprise systems coupled over a network and distributed over one or more geographic boundaries and one or in ore organizational boundaries.

* * * * *

UNITED STATES PATENT AND TRADEMARK OFFICE
CERTIFICATE OF CORRECTION

| | | |
|---|---|---|
| PATENT NO. | : 8,838,636 B2 | Page 1 of 1 |
| APPLICATION NO. | : 13/770839 | |
| DATED | : September 16, 2014 | |
| INVENTOR(S) | : Shrinivas Kulkarni et al. | |

It is certified that error appears in the above-identified patent and that said Letters Patent is hereby corrected as shown below:

TITLE PAGE: ITEM (72)

The spelling of the first inventor's name is corrected to Shrinivas Kulkarni

Signed and Sealed this
Thirteenth Day of January, 2015

Michelle K. Lee
*Deputy Director of the United States Patent and Trademark Office*